(12) United States Patent
Anderson et al.

(10) Patent No.: US 12,511,800 B2
(45) Date of Patent: Dec. 30, 2025

(54) SYSTEMS AND METHODS OF GENERATING PLAYLISTS/SEQUENCES OF IMAGES

(71) Applicant: Battelle Memorial Institute, Columbus, OH (US)

(72) Inventors: Allen K. Anderson, San Antonio, TX (US); Michael Hausler, Egg Harbor Township, NJ (US); Patrick Kotowski, Lakewood, NJ (US); Rodney Hallgren, Philadelphia, PA (US)

(73) Assignee: Battelle Memorial Institute, Columbus, OH (US)

( * ) Notice: Subject to any disclaimer, the term of this patent is extended or adjusted under 35 U.S.C. 154(b) by 316 days.

(21) Appl. No.: 18/154,125

(22) Filed: Jan. 13, 2023

(65) Prior Publication Data
US 2023/0230298 A1    Jul. 20, 2023

Related U.S. Application Data

(60) Provisional application No. 63/300,402, filed on Jan. 18, 2022.

(51) Int. Cl.
*G06T 11/00* (2006.01)
*G06F 3/0482* (2013.01)
*G06F 3/04845* (2022.01)

(52) U.S. Cl.
CPC .......... *G06T 11/008* (2013.01); *G06F 3/0482* (2013.01); *G06F 3/04845* (2013.01); *G06T 2200/24* (2013.01)

(58) Field of Classification Search
CPC ............................ G06T 11/008; G06F 3/0482
See application file for complete search history.

(56) References Cited

U.S. PATENT DOCUMENTS

| | | |
|---|---|---|
| 9,565,403 B1 | 2/2017 | Higgins |
| 2002/0030634 A1 | 3/2002 | Noda et al. |
| | (Continued) | |

OTHER PUBLICATIONS

International Search Report and Written Opinion from corresponding PCT Appln. No. PCT/US23/60610, dated May 2, 2023. 9 pages.
(Continued)

*Primary Examiner* — Matthew Salvucci
(74) *Attorney, Agent, or Firm* — Grossman, Tucker, Perreault & Pfleger, PLLC; Donald G. Weiss

(57) ABSTRACT

In an approach to generating playlists/sequences of images, a system includes: a memory configured to store at least a first image; a one or more computer processors; one or more non-transitory computer readable storage media; and program instructions. The program instructions include: receive the first image; determine at least one characteristic associated with an object represented within the first image and an expected user input associated with the at least one characteristic; and generate a sequence definition, the sequence definition including an identifier of the first image and an identifier of the at least one characteristic, where the sequence definition is configured to cause the first image to be interactively visualized to a user via a user interface to determine if a user input matches an expected user input based on the identifier of the at least one characteristic.

20 Claims, 5 Drawing Sheets

(56) References Cited

U.S. PATENT DOCUMENTS

2007/0282937 A1* 12/2007 Brinson .................. G06F 18/40
                                                        708/424
2018/0033150 A1*  2/2018 Lieblich ................... G06T 7/12
2019/0209116 A1   7/2019 Sjöstrand et al.
2020/0273557 A1   8/2020 Wolf et al.

OTHER PUBLICATIONS

International Preliminary Report on Patentability from corresponding PCT Appln. No. PCT/US2023/060610, dated Aug. 2, 2024. 8 pages.

* cited by examiner

SYSTEMS AND METHODS OF GENERATING PLAYLISTS/SEQUENCES OF IMAGES

CROSS-REFERENCE TO RELATED APPLICATIONS

The present application claims the benefit of the filing date of U.S. Provisional Application Ser. No. 63/300,402, filed Jan. 18, 2022, the entire teachings of which application is hereby incorporated herein by reference.

TECHNICAL FIELD

The following disclosure relates generally to systems and methods of generating playlists/sequences of images that are visualized via an interactive training application.

BACKGROUND

Present transportation security protocols include two-dimensional (2D) X-ray and three-dimensional (3D) computed tomography (CT) scanners that generate images for training human screeners, e.g., Transportation Security Officers (TSOs) such as Transportation Security Administration (TSA) officers, to identify dangerous threats and other contraband within bags and luggage. Adequate training of such individuals is important to ensuring passenger safety. However, such training requires a relatively large number of images to be presented that include both bags with non-threatening objects as well as bags carrying threat/contraband objects (e.g., guns, knives, explosives, drugs). In addition, each scanner system can generate images with varying resolutions and manufacturer-specific peculiarities due to, for instance, the particular image sensor utilized and post-processing through algorithms such as de-noising algorithms. Such post-processing algorithms can be standard or proprietary to a particular manufacturer. This can result in perceivable differences in image quality and characteristics between manufacturers. Indeed, substantial differences in generated images can occur even between scanner systems of the same manufacturer.

The training of a human screener, e.g., a TSO officer, tends to include the use of training images generated by the same scanner system as will be used in the field by the human screener rather than generic images. Likewise, machine learning approaches tend to utilize training images from the same scanner as will be used to generate images under test/analysis.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
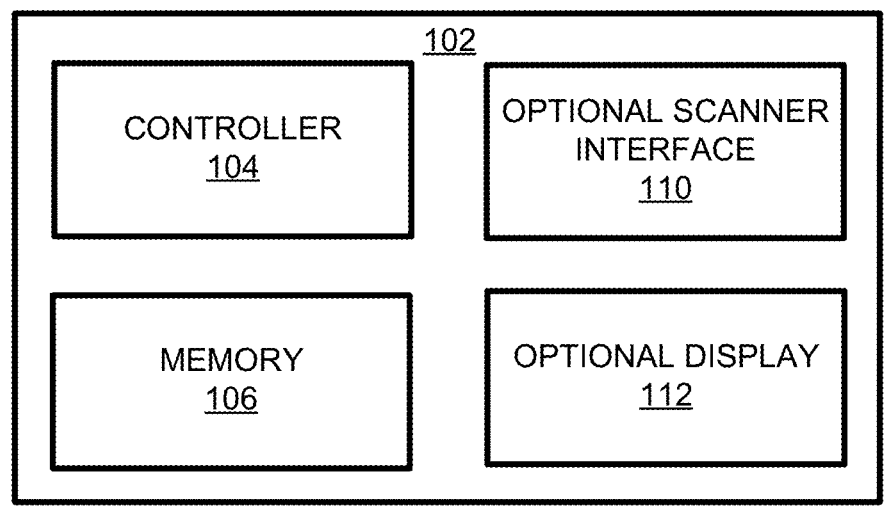
FIG. 1 shows an example system for generating a sequence definition consistent with the present disclosure.

Generating images, such as X-ray and CT images that include threat/contraband objects represented therein, for each scanner system to be trained/certified on, requires a significant investment of time and expense due to the wide range of existing makes and models of X-ray and CT scanners. Moreover, periodic updates and revisions (such as through software and/or hardware updates) can result in two scanners of the same type/model generating perceivably different images. Although important to proper training of human screeners and/or machine learning models, these challenges can make it impractical to provide training images that are consistent with those of the target/deployed scanner system. As used herein, images may include, but are not limited to, 2D images, such as X-ray data, 3D images, such as CT data, or both.

Thus, the present disclosure is generally directed to the issue of generating a sequence definition that can be utilized to present a sequence of images to a user for training purposes, e.g., for training a TSO on a target scanner system. The sequence definition can be created/modified via an "app" that provides a user interface for modification of the sequence definition. Each sequence definition can be directed to a different target scanner system or model, for example.

The user interface may provide a plurality of UI controls to, for instance, create, update, and delete sequences that can be defined within a sequence definition. The user interface also allows for selection of at least one image to be displayed when each sequence is presented by a training application. The user interface also further allows for one or more areas of interest to be associated/defined within each image. In some embodiments, the user interface allows for the area of interest to be associated with user-selectable parameters such as a threat type for the region of interest.

Accordingly, each sequence defined within the sequence definition can be used to cause an interactive visualization of images, e.g., via the area of interest and/or user-selectable parameters. In some embodiments, the sequence definition can be used to cause an interactive visualization of image files. The interactive visualization of image files further includes presenting a user interface with one or more characteristics consistent with a target scanner system. Some such example characteristics include icons, fonts, labels, component positions, on-screen controls (e.g., to manipulate a view plane, zoom in/out), and other related user interface elements to ensure that the interactive visualization emulates the "real" scanner system during training. During training, user input matching an expected result, such as a mouse click at a location corresponding to a user-selectable region of interest, can be used to score/evaluate a user during training for the corresponding user-selectable scanner system.

A sequence definition consistent with the present disclosure can be stored as, for example, a file within a file system or other memory location. The sequence definition may be implemented via one or a plurality of files stored in the memory. The sequence definition may refer to external elements such as image files, colorization templates/configs, and other associated files through a reference/identifier (e.g., a file path string) and/or have external elements stored inline within the sequence definition, e.g., through base64 encoding. The sequence definition references images through an identifier that corresponds to a location within a collection of images, e.g., an image database. The collection may include a plurality of different images, and a plurality of images that include representations of bags with, or without, threat/contraband objects. The sequence definition may be portable and can be transferred between computer systems via, for instance, a network connection, computer-readable media such as a compact disc, or a removable universal serial bus (USB) drive. As used herein, the term "threat" in the context of objects within images also encompasses contraband items such as illicit drugs, animals, and food items.

Aspects of the present disclosure advantageously provide a tool that allows users to import images into the "app" via the user interface and set/select options on how the image will be displayed and scored. In addition, characteristics for the image can be set/assigned by a user such as a threat type, area of interest, and visual annotations such as alarm boxes. The area of interest may be set by a user-selected location, i.e., by the user clicking on a location on the user interface. The alarm boxes identify a region, or subvolume, in the 2D image or 3D image/volume, which the trainee should recognize as a threat, hazardous material, or prohibited item. Alarm boxes may also be deliberately created around benign items to reinforce threat recognition and identification goals. The alarms boxes set the physical coordinate boundaries for the threat or area of interest. If the area of interest is going to be singled out and displayed separately from the entire 2D image or 3D image/volume, only images within the alarm box coordinate boundaries are displayed. If the trainee must identify the threat using a selector/marker, the determination if the trainee identified the correct area of interest is calculated by whether the marker's coordinates are within the alarm box coordinates.

Various aspects of the present disclosure can be implemented via a computer-implemented method consistent with the present disclosure. A computer system, such as computer system 100 discussed below, can include a controller configured to execute a computer-implemented method consistent with the present disclosure. In this example, the computer-implemented methods of the present disclosure can be implemented via a plurality of non-transitory machine-readable instructions stored in a memory that, when read by the controller, are configured to cause the controller to execute the computer-implemented methods disclosed herein.

Turning to the Figures, FIG. 1 shows an example computer system 100 for rendering of images consistent with aspects of the present disclosure. The computer system 100 includes at least one computer device 102 implemented as a laptop/desktop computer, or as a plurality of computer devices configured to communicate with each other via a network. In any such cases, the computer device 102 is configured to implement a rendering process consistent with the present disclosure.

As shown, the computer device 102 may include a controller 104, a memory 106, an optional scanner interface 110, and an optional display 112. The controller 104 may be implemented as at least one processing device/circuit such as, for example, a digital signal processor (DSP), a field-programmable gate array (FPGA), Reduced Instruction Set Computer (RISC) processor, x86 instruction set processor, microcontroller, or an application-specific integrated circuit (ASIC). The controller 104 can comprise a single chip, or multiple separate chips/circuitry. As discussed further below, the controller 104 can be configured to execute processes consistent with the present disclosure using software (e.g., C or C++ executing on the controller 104), hardware (e.g., circuitry, hardcoded gate level logic or purpose-built silicon), firmware (e.g., embedded routines executing on a microcontroller), or any combination thereof. In one example, the controller 104 is configured to execute and carry out the process of FIG. 4.

The memory 106 can comprise volatile and/or non-volatile memory devices. The memory 106 may include a plurality of images. The plurality of images are X-ray or CT images that represent bag images. In this example, each bag image can include a representation of threat and/or non-threat object(s). Each bag image can be stored with an identifier of a scanner model that generated the bag image. This mapping/association between bag images and identifiers of a corresponding scanner model can be stored within a table/lookup, for example.

The computer device 102 further includes an optional scanner interface 110. The optional scanner interface 110 can be configured to communicate with 3D CT scanning equipment such as positron emission tomography (PET-CT) and/or magnetic resonance imaging (MRI) systems via a data bus (not shown), as well as 2D X-ray imaging systems. The optional scanner interface 110 can be configured to receive images from the scanning equipment for storage in the memory 106, for example. However, it should be noted that images may also be received via a network storage location on another computer device/server, e.g., via the Internet, and not necessarily received directly from scanning equipment.

The optional display 112 can comprise a computer monitor such as a liquid crystal display (LCD) computer monitor.

The computer device 102 can be configured to execute an interactive training application that utilizes rendered images consistent with the present disclosure for training of scanners, such as TSOs. Such rendered images can be presented in a two-dimensional and/or 3D format.

As used herein, the term images may also refer to data that represents a volumetric (i.e., 3D) image of an object (or objects). The images may be generated by, for example, X-ray CT, PET-CT, and/or MRI systems. However, other types of 3D/CT imaging sensors/systems are within the scope of this disclosure, as are standard 2D X-ray images.

Images consistent with the present disclosure may include a 3D matrix of volume elements, sometimes called voxels. The images describe the physical relationship between voxels such that the position of each voxel of a given object, or set of objects, is identifiable within 3D space. Each voxel can be represented by, for instance, an integer value that denotes a density value or effective atomic number (Zeff) as detected by a CT scanner. Generally, a higher value for a voxel indicates relatively dense material, such as metal, while a lower value indicates a relatively less dense material such as fabric and air. However, this disclosure is not necessarily bound to a particular numerical representation of voxels and the provided examples are provided by way of illustration and not limitation.

As generally referred to herein, the term bag image generally refers to images representing a bag or other container commonly used for air, train, or sea travel such as luggage bags, backpacks, and boxes. Bag images consistent with the present disclosure can include non-threatening objects and/or threat objects disposed within one or more associated bag subvolumes. Non-threating objects, or non-threat objects, can include clothes, computers, and other items commonly placed within bags during travel. Threat objects can include representations of dangerous or otherwise prohibited objects within images that can be found within bags such as guns, knives, explosives, and other weapons, as well as contraband items as described above. Images consistent with the present disclosure can include representations of only non-threating objects, only threat objects, or a combination of both non-threating objects and threat objects (e.g., within a same volume or otherwise adjacent to each other).

Figure 2:
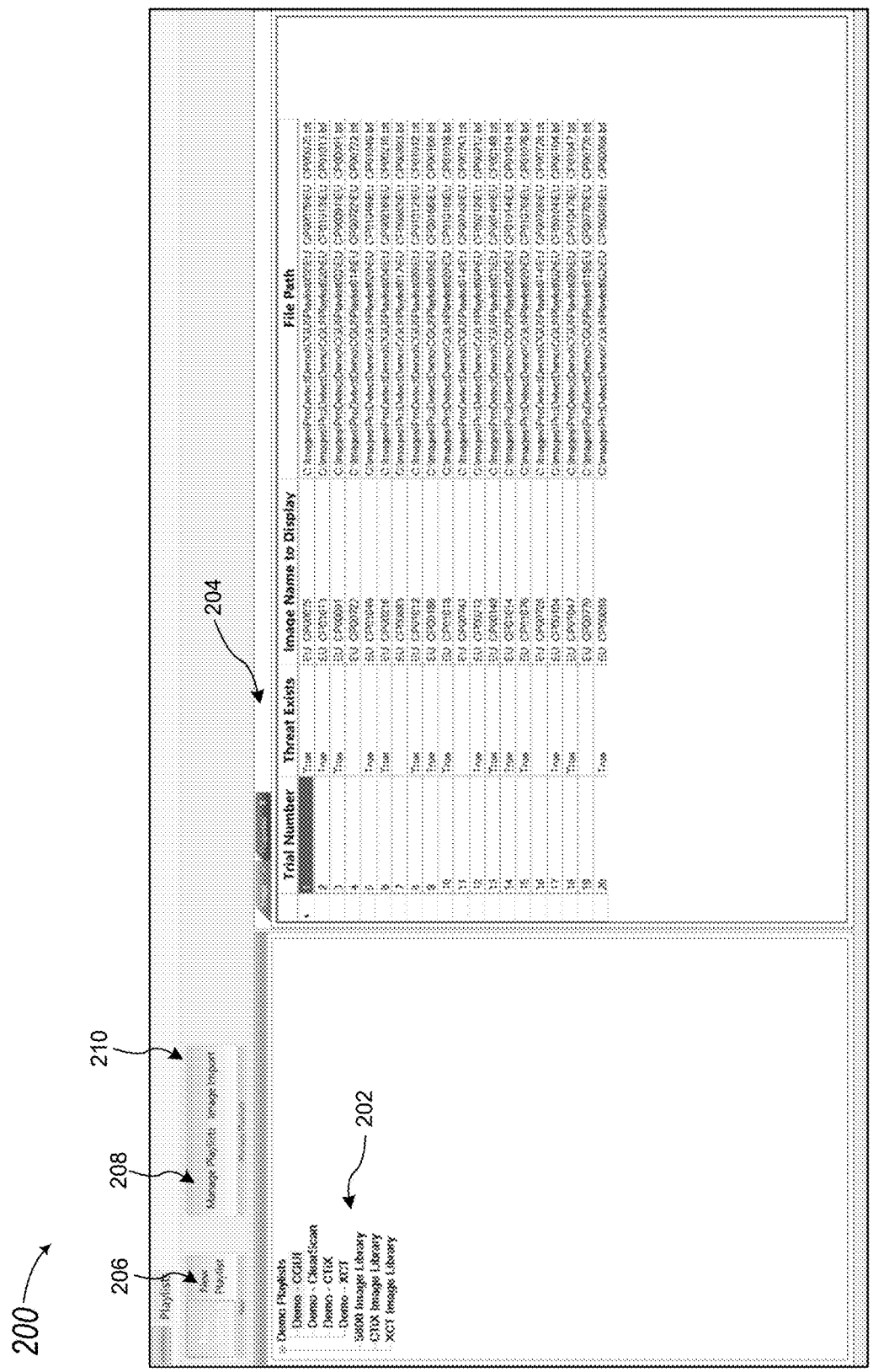
FIG. 2 shows an example user interface (UI) of an application that can be executed via the system of FIG. 1, in accordance with aspects of the present disclosure.

FIG. 2 shows an example UI 200 for generation of a playlist or sequence of images for training of TSOs consistent with aspects of the present disclosure. The example UI 200 can be executed via an "app" stored in the memory 106 (see FIG. 1) and visualized via display 112, for example.

As shown, the UI 200 may include a playlist tree 202, and a playlist properties view 204. The playlist tree 202 may include a plurality of user-selectable items. Each of the user-selectable items in the playlist tree 202 can correspond to a different sequence definition stored in the memory 106.

Each sequence definition can be stored in the memory 106 as, for example, a human readable file in a format such as JavaScript Object Notation (JSON). However, each sequence definition can be stored in other file formats including both human-readable formats (e.g., ASCII/JSON) and non-readable formats such as binary-encoded. Each sequence definition can correspond to a specific scanner model/type and be composed of images generated by the same. However, this disclosure is not necessarily limited in this regard and the images for a given sequence definition can be generated dynamically. One such example process for generation of images that emulate target image systems is an approach to generating CT images that emulates output of a user-selectable scanner system, a controller receives images, e.g., a reference image, having a first resolution. In this process, a second resolution is determined, the second resolution being different than the first resolution; the images are resampled based on the second resolution; and the resampled images is output. Using this approach, a controller can generate an emulated image based on resampling of images having a first resolution to a second resolution, with the second resolution being based on a resolution of a target scanner system.

The UI 200 allows for adding new sequence definitions, deleting sequence definitions, and updating of sequence definitions via user interface elements such as a context menu (not shown) that may be shown in response to a user performing, for example, a right mouse click within the playlist tree 202. In addition, the UI 200 can include a button 206 for creation of a new playlist item within the playlist tree 202, and thus by extension, creation of a new corresponding sequence stored within the memory 106.

In some embodiments, the playlist properties view 204 visually presents a plurality of parameters based on a sequence definition that corresponds with a user-selected item within the playlist tree 202. Table 1 shows an example plurality of parameters for a target sequence definition that can be shown via the playlist properties view 204.

TABLE 1

| Parameter | Data Type | Description |
| --- | --- | --- |
| Trial Number (or Sequence Index) | Integer | Assigned index of trial |
| Threat Exists | Boolean | True when a threat object is represented within image, false otherwise |
| Image Name to Display | String | Name/Alias assigned to image |
| File Path | String | Location of image within memory/file system |

Each of the presented parameters within the playlist properties view 204 can be user-editable or read-only depending on a desired configuration.

The UI 200 can further include a button 208 to visualize/show additional options for management of playlists/sequences. The UI 200 can further include a button 210 to import images into the sequence definition corresponding to the selected/target sequence item.

Figure 3:
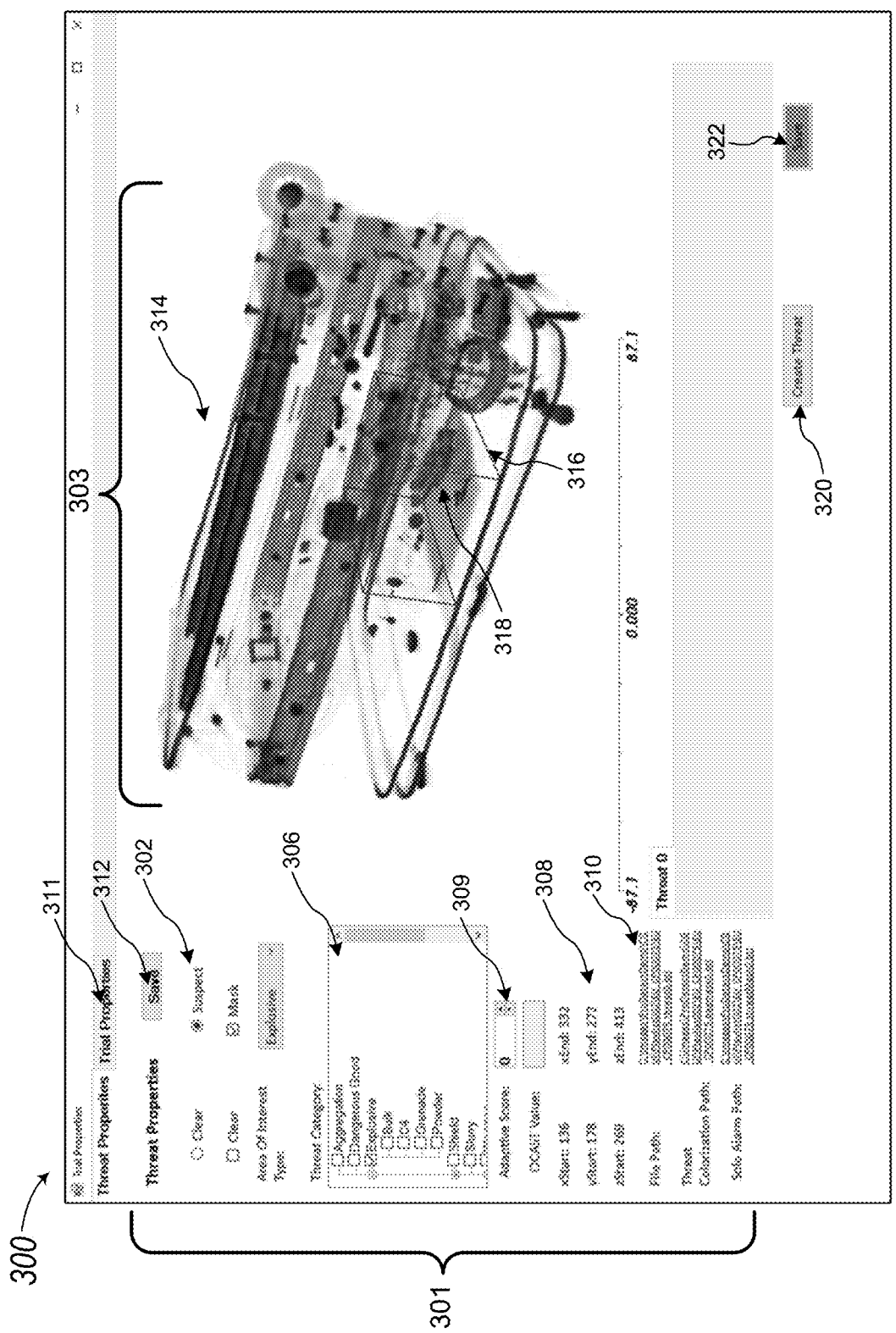
FIG. 3 shows another example UI of an application that can be executed via the system of FIG. 1, in accordance with aspects of the present disclosure.

FIG. 3 shows another example UI 300 for generation of a sequence/playlist of volumetric images for training of TSOs consistent with aspects of the present disclosure. The UI 300 can be visualized/presented based on, for example, receiving an indication of user selection of a sequence within the playlist properties view 204 (See FIG. 2). In the example illustrated in FIG. 3, a 3D CT scan sequence/playlist is shown. The basic flow of the example of FIG. 3, however, is also applicable to a 2D X-ray scan sequence/playlist.

The UI 300 may include a properties section 301 and a 3D preview area 303. The properties section 301 may include a plurality of UI components for modifying parameters associated with each volumetric image to be displayed during an interactive training routine/application along with associated data for the particular sequence the volumetric image is assigned to.

The threat properties may include a selection 302 for a threat type (e.g., clear or suspect), and may include a mask indicator. The mask indicator can be enabled (such as shown) to cause a mask to be visually applied to the associated volumetric image to highlight a region, i.e., area of interest, as discussed further below. An area of interest selector can be utilized to set a type for the area of interest associated with the mask/threat. This allows for the querying, sorting, and filtering of trials based on trial image area of interest characteristics. Setting the area of interest value allows for playlist construction containing specific characteristics, such as sheet explosive. The alarm's mask color will be applied based on the area of interest type value. For example, in some systems, sheet explosive alarms are masked red while shields are masked yellow.

The threat category options 306 allow for a particular category of threat to be assigned to the associated volumetric image. One or a plurality of different threat categories can be assigned to the associated volumetric image.

An adaptive score input box 309 can be utilized to set an adaptive score for the threat. The adaptive score can be used to create playlists with images of a desired difficulty. These playlists can be prepared before the trainee begins their training session. Additionally, a playlist may be marked as an adaptive playlist where, based on the trainee threat recognition performance during training, the difficulty of subsequent trials may increase or decrease.

Multiple unique threats may be defined for a given volumetric image. For instance, the button 320 may be selected to cause an interface to appear that allows the user to add an additional threat to be associated with the volumetric image shown in 3D preview area 303.

Threat coordinates 308 can be used to indicate a position of the threat within the associated volumetric image. Additional path details 310 can be optionally shown to indicate a file path for a file that stores the values represented by the properties section 301. Changes made to parameters via the UI controls of the properties section 301 may then be saved, e.g., via the button 312, to memory at the indicated file path location. Additional file paths can include a threat colorization path and a solo alarm path. These paths are configured to provide the means to render and display the alarm image/sub-volume separately from the bag image. The alarm mask may not be dynamically generated. In that case, the threat colorization path is used to apply the alarm's mask overlaying the alarm image.

As further shown, a trial properties tab 311 can be selected to visualize sequence parameters. A user may then modify the parameters via UI controls. Some such example parameters include a sequence index for the given trial, whether the trial, and its images, conveys a threat (also known as Clear or Suspect), threat category (for example, instead of just the threat category of gun, revolver can also be selected), OCAST value (this is an image opaqueness and complexity calculation which, upon passing a certain threshold, tends to suggest the trainee will not be able to determine if the bag is clear of threats).

The 3D preview area 303 may visualize a volumetric image 314 associated with the particular trial selected by a user, e.g., via the playlist properties view 204 (See FIG. 2). In some embodiments, the visualized volumetric image is a 3D CT image. In some embodiments, the visualized volumetric image 314 includes shading/coloring based on the density of the objects represented within the 3D CT image.

In some embodiments, the 3D preview area 303 can receive user input (e.g., via a mouse or other input device) to adjust, for instance, the particular scale of the image and/or to zoom in/out of a desired region.

In some embodiments the 3D preview area 303 can receive user input to define a bounding volume 316. The bounding volume 316 can be a 3D geometric shape such as a box as shown, or a 2D geometric shape such as a rectangle. However, the particular shape of the bounding volume 316 is not necessarily limited in this regard and may be any regular or non-regular geometric shape.

In some embodiments, a position of the bounding volume 316 within the volumetric image 314 can be adjusted based on user input, such as through a mouse drag and drop operation. In some embodiments, at least one dimension (length, width, height) of the bounding volume 316 can be adjusted based on user input.

The bounding volume 316 may be disposed at a location within the visualized volumetric image 314 that causes an object of interest such as object 318 to at least be partially disposed within the bounding volume 316.

In one example, the position of the bounding volume 316 within the volumetric image 314 can be automatically determined based on receiving an indication of a user selection of an object shown within the volumetric image 314. For example, consider a scenario where the 3D preview area 303 receives an indication of a user selection at a coordinate within the volumetric image 314 that object 318 is disposed at, and in response thereto, automatically inserts the bounding volume 316 as an overlay on to the volumetric image 314 and orients the bounding volume 316 such that at least a portion of object 318 is encompassed/disposed within the 3D space occupied by the bounding volume 316.

In one example, the bounding volume 316 can be used to determine a position for a mask when enabled via the mask indicator discussed above. The mask may be configured to appear in color per the set area of interest type value. The mask may not be applied to all images within the bounding box. The mask will be applied to voxels with a specific CT value within the bounding box.

Note, N number of bounding volumes may be defined, and each volumetric image is not limited to a single bounding volume.

The bounding volume 316 may also be associated with a visibility flag or toggle that determines visibility of the bounding volume 316 when the volumetric image 314 is rendered and presented to a TSO by an interactive training application. When the flag or toggle is enabled, a representation of the bounding volume 316 may then be visualized as an overlay on the visualized volumetric image 314 to a TSO. When the flag or toggle is disabled, the bounding volume 316 may be obscured/hidden from view of the TSO. An opacity value and/or hue value for the bounding volume 316 may be configurable based on user input.

The button 322 can be configured to cause generation of a sequence definition. The generated sequence definition may be stored in a memory, such as the memory 106.

The generated sequence definition may include a plurality of sequences, with each sequence being associated with an identifier of a volumetric image, and a CT image, to be presented to a user during an automated training application. In some embodiments, each sequence is associated with an identifier of at least one characteristic. The at least one characteristic may also be referred to herein as a threat characteristic. The identifier of the at least one characteristic can be based on the user-selected parameters within the properties section 301. The identifier of the at least one characteristic can also be based on one or more bounding volumes, such as bounding volume 316.

The generated sequence definition may be configured to cause each sequence to be presented to a user in an order based on the sequence index as discussed above. In some embodiments, each visualized sequence includes presenting/ showing at least a portion of an associated volumetric image.

In some embodiments, the presented volumetric image is shown in a 3D format that can optionally include color/ shading for indicating relative material densities within the represented objects. In one example, presenting the volumetric image can include modifying at least one image characteristic to emulate a target CT scanner system. Some such example image characteristics can include resolution, hue/opacity values for showing relative differences in material densities, the particular shading/colorization scheme (e.g., composite ray projection), and/or virtual camera properties (e.g., perspective vs. parallel projection, field of view, clipping range, etc.).

In some embodiments, the generated sequence is configured to cause each sequence to be interactively visualized. For example, a given sequence can include one or more parameters, or characteristics, e.g., as discussed above with regard to FIG. 3, to define areas of interest within an associated volumetric image and parameters associated with the area of interest such as threat type/category, mask enabled/disabled, and a bounding volume for the area of interest. A user may then supply input to the visualized sequence via a mouse or other suitable input device such as a finger of a user on a touch screen. For instance, the visualized sequence can include presenting an associated volumetric image in a region of a user interface and monitoring for mouse events occurring within the region. The position of a detected mouse/user-input event may then be converted to an associated position/coordinate within the volumetric image. In one example, user-input identified as corresponding to the location of a bounding volume associated with the volumetric image may then be utilized to determine that the user-input corresponds with an expected user input. More simply stated, a user input event such as a mouse click on the area/region of a volumetric image having a bounding box associated thereto may be used to identify that a user correctly selected a location of a threat object. In response to detecting that the user input matches the expected user input, a score value for the sequence may be incremented/increased to reflect a correct answer. On the other hand, user input that does not match an expected user input, such as a user selecting/clicking on a region of a volumetric image that does not have an associated threat object represented therein, may cause a score value to be decremented/lowered.

Figure 4:
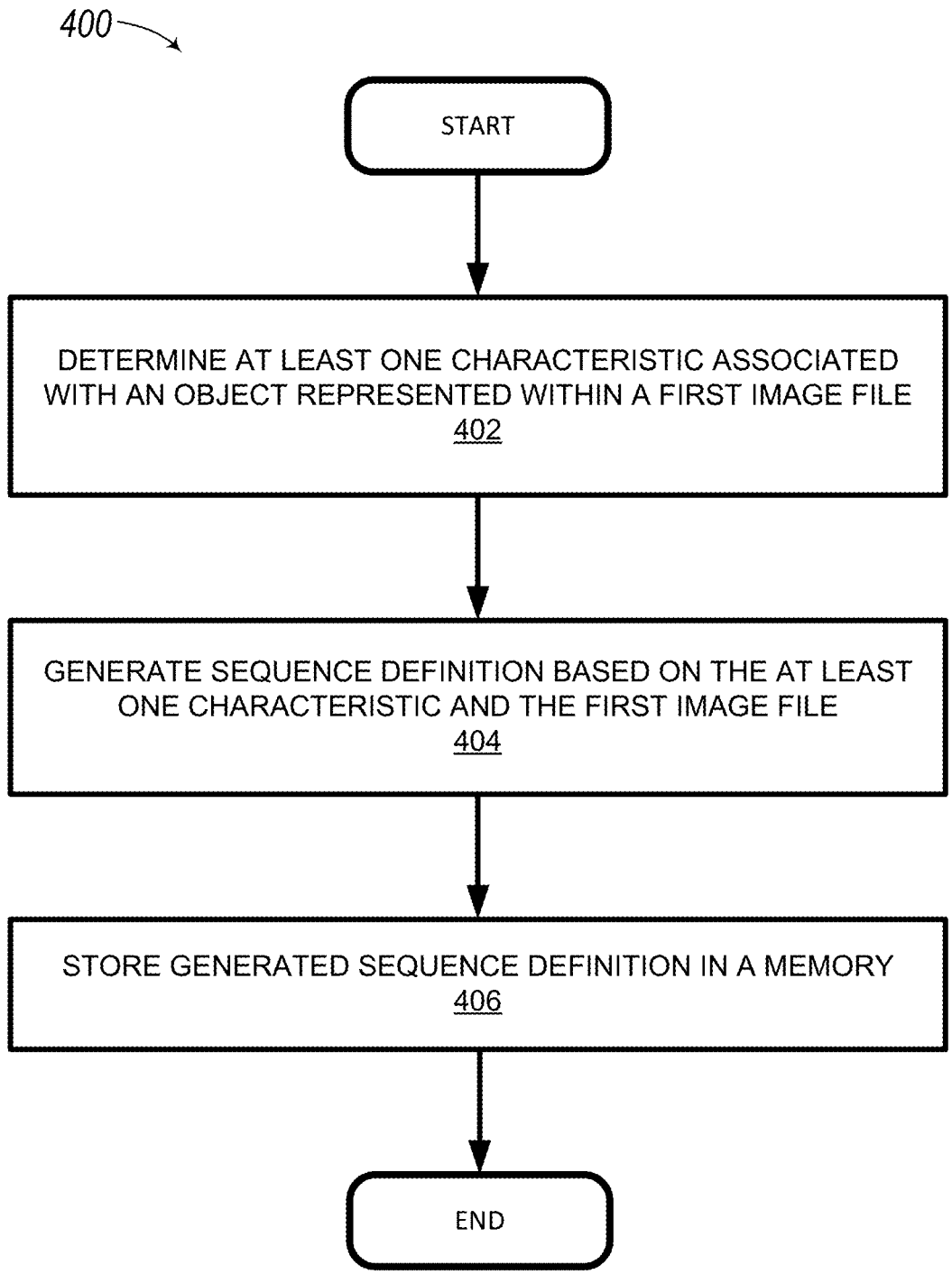
FIG. 4 shows an example process for generating a sequence definition consistent with the present disclosure.

FIG. 4 shows one example process 400 that exemplifies various aspects and features of the foregoing. The process 400 includes acts of determining 402 at least one characteristic associated with an object represented within a first image. Generating 404 a sequence definition based on the at least one characteristic and the first image. Storing 406 the generated sequence in a memory. In some embodiments, the generated sequence definition is configured to cause the first image to be interactively visualized to a user via a user interface to determine if a user input matches an expected user input based on the identifier of the at least one characteristic.

Figure 5:
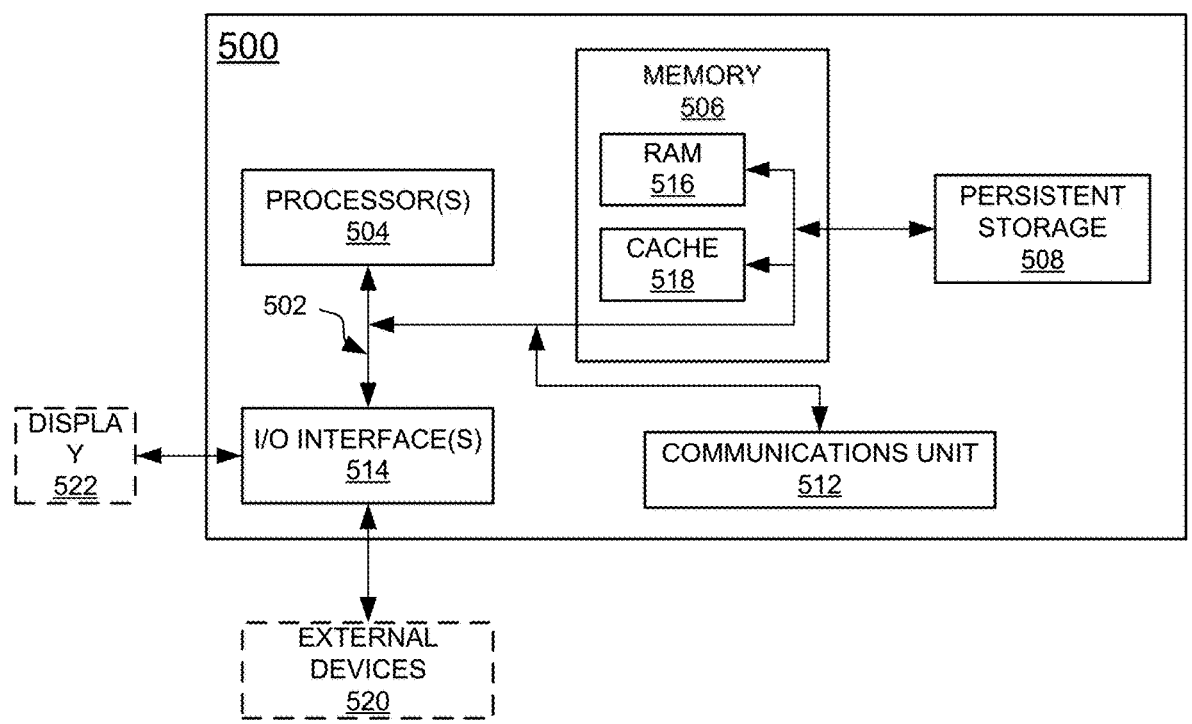
FIG. 5 depicts a block diagram of components of the computing device generating a sequence definition within the distributed data processing environment of FIG. 1, in accordance with an embodiment of the present disclosure.

FIG. 5 is a block diagram depicting components of one example of the computer device 102, within the distributed data processing environment of FIG. 1, consistent with the present disclosure. FIG. 5 displays the computing device or computer 500, one or more processor(s) 504 (including one or more computer processors), for example, computer device 102 from FIG. 1, a communications fabric 502, a memory 506 including a random-access memory (RAM) 516 and a cache 518, a persistent storage 508, a communications unit 512, I/O interfaces 514, a display 522 which may be, for example, optional display 112 of FIG. 1, and external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over the communications fabric 502, which provides communications between the computer processor(s) 504, memory 506, persistent storage 508, communications unit 512, and input/output (I/O) interface(s) 514. The communications fabric 502 may be implemented with an architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a RAM 516 and a cache 518. In general, the memory 506 can include any suitable volatile or non-volatile computer readable storage media. Cache 518 is a fast memory that enhances the performance of processor(s) 504 by holding recently accessed data, and near recently accessed data, from RAM 516.

Program instructions for computer device 102 may be stored in the persistent storage 508, or more generally, any computer readable storage media, for execution by one or more of the respective computer processors 504 via one or more memories of the memory 506. The persistent storage 508 may be a magnetic hard disk drive, a solid-state disk drive, a semiconductor storage device, flash memory, read only memory (ROM), electronically erasable programmable read-only memory (EEPROM), or any other computer readable storage media that is capable of storing program instruction or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

The communications unit 512, in these examples, provides for communications with other data processing systems or devices. In these examples, the communications unit 512 includes one or more network interface cards. The communications unit 512 may provide communications through the use of either or both physical and wireless communications links. In the context of some embodiments of the present disclosure, the source of the various input data may be physically remote to the computer 500 such that the input data may be received, and the output similarly transmitted via the communications unit 512.

The I/O interface(s) 514 allows for input and output of data with other devices that may be connected to computer 500. For example, the I/O interface(s) 514 may provide a connection to external device(s) 520 such as a keyboard, a keypad, a touch screen, a microphone, a digital camera, and/or some other suitable input device. External device(s) 520 can also include portable computer readable storage media such as, for example, thumb drives, portable optical or magnetic disks, and memory cards. Software and data used to practice embodiments of the present disclosure can be stored on such portable computer readable storage media and can be loaded onto persistent storage 508 via the I/O interface(s) 514. I/O interface(s) 514 also connect to a display 522.

Display 522 provides a mechanism to display data to a user and may be, for example, a computer monitor. Display 522 can also function as a touchscreen, such as a display of a tablet computer.

According to one aspect of the present disclosure, there is thus provided a system for generating playlists/sequences of images. The system includes: a memory configured to store at least a first image; a one or more computer processors; one or more non-transitory computer readable storage media; and program instructions stored on the one or more computer readable storage media for execution by at least one of the one or more computer processors. The stored program instructions include instructions to: receive the first image; determine at least one characteristic associated with an object represented within the first image and an expected user input associated with the at least one characteristic; and generate a sequence definition, the sequence definition including an identifier of the first image and an identifier of the at least one characteristic, wherein the sequence definition is configured to cause the first image to be interactively visualized to a user via a user interface to determine if a user input matches an expected user input based on the identifier of the at least one characteristic.

According to another aspect of the disclosure, there is provided a computer-implemented method for generating playlists/sequences of images. The computer-implemented method includes: receiving, by one or more computer processors, a first image; determining, by the one or more computer processors, at least one characteristic associated with an object represented within the first image and an expected user input associated with the at least one characteristic; and generating, by the one or more computer processors, a sequence definition, the sequence definition including an identifier of the first image and an identifier of the at least one characteristic, wherein the sequence definition is configured to cause the first image to be interactively visualized to a user via a user interface to determine if a user input matches an expected user input based on the identifier of the at least one characteristic.

According to yet another aspect of the present disclosure, there is thus provided a system for generating playlists/sequences of images The system includes: a memory configured to store at least a first image; a scanner interface; a display; a one or more computer processors; one or more non-transitory computer readable storage media; and program instructions stored on the one or more computer readable storage media for execution by at least one of the one or more computer processors. The stored program instructions include instructions to: receive the first image; determine at least one characteristic associated with an object represented within the first image and an expected user input associated with the at least one characteristic; and generate a sequence definition, the sequence definition including an identifier of the first image and an identifier of the at least one characteristic; generate the sequence definition to the first image and a second image based on user input, the sequence definition including an identifier of the first image and an identifier of the at least one characteristic; display the first image and the second image for the user via a user interface on the display in an order based on the generated sequence definition; and responsive to receiving an input from the user, determine if the user input matches an expected user input based on the identifier of the at least one characteristic.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system or a computer-implemented method. The system may include one or more non-transitory computer readable storage media having computer readable program instructions stored thereon for causing a processor to carry out aspects of the present disclosure.

The one or more non-transitory computer readable storage media can be any tangible device that can retain and store instructions for use by an instruction execution device. The one or more non-transitory computer readable storage media may be, for example, but are not limited to, an electronic storage device, a magnetic storage device, an optical storage device, an electromagnetic storage device, a semiconductor storage device, or any suitable combination of the foregoing. A non-transitory computer readable storage media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from one or more non-transitory computer readable storage media or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in one or more non-transitory computer readable storage media within the respective computing/processing device.

Computer readable program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or other Programmable Logic Devices (PLD) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems and methods, according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

From the foregoing it will be appreciated that, although specific examples have been described herein for purposes of illustration, various modifications may be made without deviating from the spirit and scope of the disclosure described herein. Accordingly, the disclosure is not limited except as by corresponding claims and the elements recited by those claims. In addition, while certain aspects of the disclosure may be presented in certain claim forms at certain times, the inventors contemplate the various aspects of the disclosure in any available claim form. For example, while only some aspects of the disclosure may be recited as being embodied in a computer-readable medium at particular times, other aspects may likewise be so embodied.

What is claimed is:

1. A system for generating playlists/sequences of images, the system comprising:
   a memory configured to store at least a first image;
   a one or more computer processors;
   one or more non-transitory computer readable storage media; and
   program instructions stored on the one or more computer readable storage media for execution by at least one of the one or more computer processors, the stored program instructions including instructions to:
      receive the first image, the first image having at least one image characteristic of a source scanner system;
      generate an emulated image having the at least one image characteristic of a target scanner system, the at least one image characteristic of the target scanner system being different than the least one image characteristic of the source scanner system;
      determine at least one object characteristic associated with an object represented within the emulated image and an expected user input associated with the at least one object characteristic;
      generate a sequence definition, the sequence definition including an identifier of the emulated image and an identifier of the at least one object characteristic, wherein the sequence definition is configured to cause the emulated image to be interactively visualized to a user via a user interface;
      receive a user input; and
      determine whether the user input matches the expected user input associated with the at least one object characteristic.

2. The system of claim 1, wherein the one or more computer processors are further configured to generate the sequence definition to the first image and a second image based on user input, and wherein the generated sequence definition is configured to cause the first image and the second image to be visualized in an order based on the generated sequence definition.

3. The system of claim 1, wherein the at least one characteristic includes an indicator of a threat type and an area of interest within the first image having an object of the threat type.

4. The system of claim 3, wherein the one or more computer processors are configured to cause the first image to be displayed via a user interface, and wherein the area of interest is determined based on a user-selected location within the first image.

5. The system of claim 3, wherein:
   the at least one characteristic further includes a bounding volume, the bounding volume defining a three-dimensional (3D) volume and a coordinate within a first computed tomography (CT) image associated with the bounding volume, and wherein the coordinate is configured to cause at least a portion of the object to be disposed within the 3D volume of the bounding volume;
   the sequence definition includes a visibility flag that can be set to a first value to cause the bounding volume to be visualized as an overlay on the first CT image by the user interface or a second value to cause the bounding volume to be hidden from view when the first CT image is visualized; and
   the bounding volume is configured to define a region of the first CT image to receive user input.

6. The system of claim 5, wherein the one or more computer processors are further configured to:
   visualize the first CT image and define a user-selectable region within the visualized first CT image for receiving user input and setting the coordinate based on the user input; and
   visualize a representation of the bounding volume as an overlay on the first CT image.

7. The system of claim 6, wherein the representation of the bounding volume is configured to be adjusted based on user input to set a location of the bounding volume and/or change a dimension of the bounding volume.

8. The system of claim 5, wherein the at least one characteristic includes a hue and/or opacity value for the bounding volume for visualizing the bounding volume by the user interface.

9. The system of claim 1, wherein:
   the image characteristic of the target scanner system and the image characteristic of the source scanner system are at least one of a resolution, one or more hue/opacity values for showing relative differences in material densities, a shading/colorization scheme, and one or more virtual camera properties; and wherein:
   the one or more virtual camera properties include at least one of projection, field of view, and clipping range.

10. A computer-implemented method for generating playlists/sequences of images, the computer-implemented method comprising:
   receiving, by one or more computer processors, a first image;
   determining, by the one or more computer processors, at least one characteristic associated with an object represented within the first image and an expected user input associated with the at least one characteristic;
   generating, by the one or more computer processors, a sequence definition, the sequence definition including an identifier of the first image and an identifier of the at least one characteristic, wherein the sequence definition is configured to cause the first image to be interactively visualized to a user via a user interface to determine if a user input matches an expected user input based on the identifier of the at least one characteristic;
   responsive to the user input matches the expected user input, increment a score value to reflect a correct answer; and
   responsive to the user input does not match the expected user input, decrement the score value.

11. The computer-implemented method of claim 10, wherein the one or more computer processors are further configured to generate the sequence definition to the first image and a second image based on user input, and wherein the generated sequence definition is configured to cause the first image and the second image to be visualized in an order based on the generated sequence definition.

12. The computer-implemented method of claim 10, wherein the at least one characteristic includes an indicator of a threat type and an area of interest within the first image having an object of the threat type.

13. The computer-implemented method of claim 12, wherein the area of interest is determined based on the one or more computer processors receiving user input.

14. The computer-implemented method of claim 13, wherein the one or more computer processors are configured to cause the first image to be displayed via the user interface, and wherein the area of interest is determined based on a user-selected location within the first image.

15. The computer-implemented method of claim 10, wherein the at least one characteristic further includes a bounding volume, the bounding volume defining a three-dimensional (3D) volume and a coordinate within a first CT image associated with the bounding volume, and wherein the coordinate is configured to cause at least a portion of the object to be disposed within the 3D volume of the bounding volume.

16. The computer-implemented method of claim 15, wherein the sequence definition includes a visibility flag that can be set to a first value to cause the bounding volume to be visualized as an overlay on the first CT image by the user interface or a second value to cause the bounding volume to be hidden from view when the first CT image is visualized.

17. The computer-implemented method of claim 16, wherein the bounding volume is configured to define a region of the first CT image to receive user input.

18. The computer-implemented method of claim 15, wherein the one or more computer processors are configured to visualize the first CT image and define a user-selectable region within the visualized first CT image for receiving user input and setting the coordinate based on the user input.

19. A system for generating playlists/sequences of images, the system comprising:
   a memory configured to store at least a first image;
   a scanner interface;
   a display;
   a one or more computer processors;
   one or more non-transitory computer readable storage media; and
   program instructions stored on the one or more computer readable storage media for execution by at least one of the one or more computer processors, the stored program instructions including instructions to:
      receive the first image, the first image having at least one image characteristic of a source scanner system;
      generate an emulated image having the at least one image characteristic of a target scanner system, the at least one image characteristic of the target scanner system being different than the least one image characteristic of the source scanner system;
      determine at least one object characteristic associated with an object represented within the emulated image and an expected user input associated with the at least one object characteristic; and
      generate a sequence definition, the sequence definition including an identifier of the emulated image and an identifier of the at least one object characteristic;
      generate the sequence definition to the emulated image and a second image based on user input, the sequence definition including an identifier of the emulated image and an identifier of the at least one object characteristic;
      display the emulated image and the second image for the user via a user interface on the display in an order based on the generated sequence definition; and
      responsive to receiving an input from the user, determine if the user input matches an expected user input based on the identifier of the at least one object characteristic.

20. The system of claim 19, wherein the one or more computer processors are further configured to:
   visualize the first image and define a user-selectable region within the visualized first image for receiving user input and setting a coordinate based on the user input; and
   visualize a representation of a bounding volume as an overlay on the first image.

* * * * *